March 18, 1941.  W. W. WATROUS, JR  2,235,510
VALVE APPARATUS
Filed Aug. 26, 1939
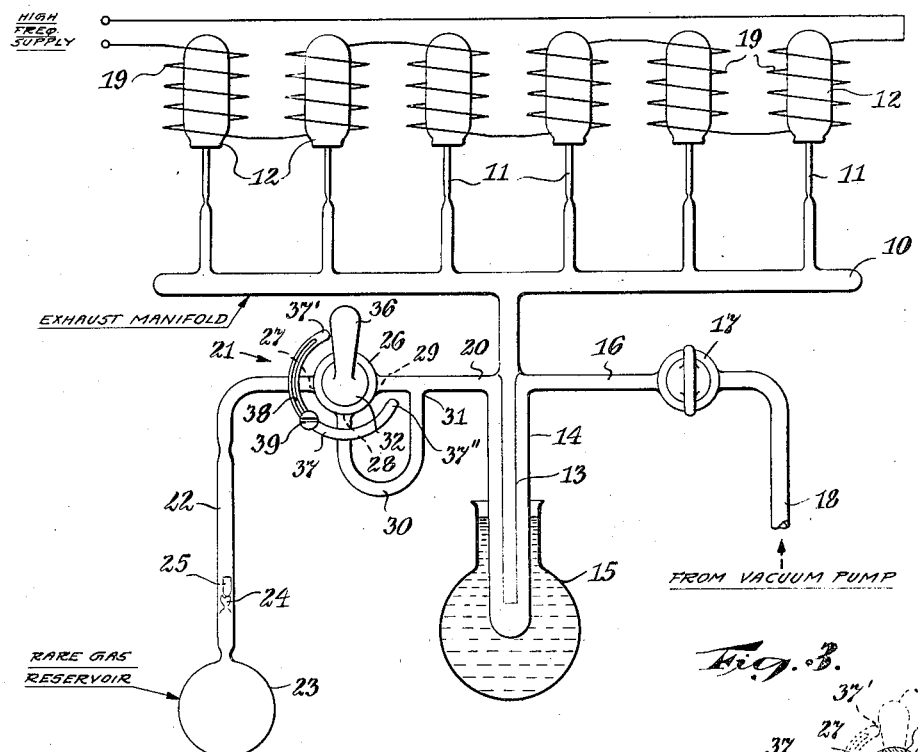
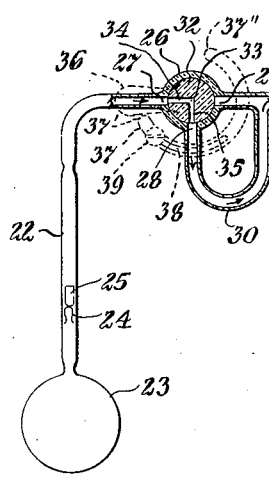
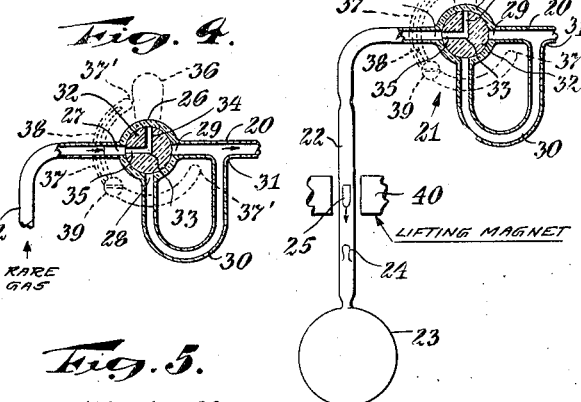
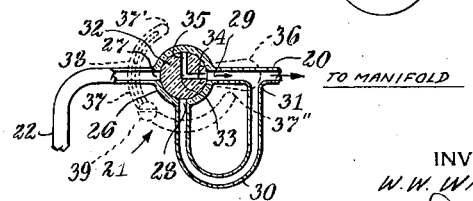
INVENTOR
W. W. WATROUS, JR.
BY
ATTORNEY Patented Mar. 18, 1941

2,235,510

UNITED STATES PATENT OFFICE 2,235,510

VALVE APPARATUS

Ward W. Watrous, Jr., East Orange, N. J., assignor to Westinghouse Electric & Manufacturing Company, East Pittsburgh, Pa., a corporation of Pennsylvania Application August 26, 1939, Serial No. 292,043

2 Claims. (Cl. 226—20)

My invention relates to valve apparatus and especially valve apparatus suitable for admitting small quantities of rare gas into gas-filled electronic devices.

An object of the invention is to provide for admission of rare gases into electronic devices without undue wastage of the gas.

Another object of the invention is to provide means whereby expensive rare gases can be inserted in a device by the ordinary factory worker without danger of wasting the gas.

Another object of the invention is to provide means for quickly and efficiently charging a plurality of tubes on a factory production basis.

Other objects and advantages of the invention will be apparent from the following description and drawing in which:

Fig. 1 is an elevational view of a tube gas filling installation embodying the invention.

Figs. 2, 3, 4 and 5 are views of the valve of Fig. 1 in cross-section illustrating the various steps in the method of filling the tube with gaseous atmosphere.

Heretofore tubes operating with small quantities of rare gases, such as neon and argon and especially the more expensive gases of krypton and xenon, were assembled by skilled workers who had prior experience in handling rare gases. The present trend toward gas-filled industrial tubes, however, has necessitated that the manufacture and assembly of these tubes be placed on a factory production basis. The result has been that the ordinary factory worker in handling these rare gases has wasted gas due to the filling of the tube to a higher pressure than required and then has pumped out the excess gas to the desired pressure. The factory worker also has lost the gas from the reservoir completely due to the inadvertent turning of the valve to the wrong position. The factory worker has also required rather close supervision in seeing that the proper pressure of gas was admitted to the tube. Inasmuch as the gas such as xenon sells for approximately $12.00 per 50 cubic centimeters at atmospheric pressure, the wastage of this gas due to inexperience or careless handling becomes quite expensive.

It is a specific object of my invention to provide means whereby the installation of the rare gas in the apparatus can be made by a highly skilled worker and then the filling of the tubes left to the ordinary factory worker with a minimum danger of loss of the expensive gas.

In Fig. 1 I have disclosed an installation for filling tubes comprising the exhaust manifold 10 having a multiple connection therefrom to the tubulations 11 connected to the tubes 12. The exhaust manifold extends through a tube 13 having its open end enclosed by another closed end tube 14. The purpose of the tubes 13 and 14 is to provide means for enclosing these tubes with a liquid air container 15 so that impurities therein may be frozen and removed through a connection 16 and valve 17 to a vacuum pump which is indicated as being attached to the other end of the tube 18 on the further side of the valve 17. The valve 17 is of course open during the exhausting of the tubes 12.

The high frequency coils 19 are illustrated diagrammatically as surrounding the tubes for the heat treatment of the elements therein, which of course comprise the well known cathode, anode and one or a plurality of grids which are not illustrated.

The tube 14 connected to the exhaust manifold, besides having a connection to the vacuum pump is also connected through a tube 20 and valve 21 to an extension 22 to which is sealed a glass reservoir 23. This glass reservoir 23 is generally in the shape of a bulb having 50 cubic centimeters of gas at atmospheric pressure therein and has its top 24 sealed with very thin glass. When the gas reservoir 23 is sealed to the extension 22 of the apparatus, a small piece of iron 25 is placed over the thin glass top 24. This iron 25 has been degasified and cleaned. Sometimes it has a hard glass coating or casing sealing it in.

The valve 21 is more particularly illustrated in cross-sectional views in Figs. 2, 3, 4 and 5. This valve comprises a housing 26 having preferably three inlets and/or outlets 27, 28 and 29 extending therefrom. 27 extends from the valve to the extension 22 to which the rare gas reservoir is sealed. The outlet 29 is connected with the tube 20 passing to the tube 14 connected to both the exhaust manifold and vacuum pump. The opening 28 is connected to a tube 30, preferably U-shaped, and connected to the tube 20 as a side branch at 31.

The valve has a revolvable body 32 inside the housing and this body has a passageway 33 therein. This passageway is adapted to be simultaneously connected to the inlet 27 and the outlet 28, but not simultaneously to the inlet 27 and the second outlet 29. As disclosed in the drawing, in view of the fact that 27, 28 and 29 are respectively 90° apart around the lower circumference of the housing, the passageway 33 takes the form of one passageway 34 to the center of the revolving body 32 and is then connected to another passageway 35 at right angles thereto. The body 32 is revolved by means of handle 36. A part ring portion 37 extends around most of the path of the handle 36. This ring portion has a slotted portion 38 therein of approximately 90° of arc and a screw 39 extends through the slot into any convenient support for the valve. This ring portion is in a plane so that the handle or a portion thereof will contact the ends 37', 37" of the part ring. When the screw 39 is screwed down the movement of the handle is limited to approximately 90° in the embodiment disclosed.

In Fig. 2 the handle 36 is turned to the dotted position disclosed wherein the passageway 33 is connected to both the inlet 27 and the outlet 28 to the U-shaped tube 30. In this position the part ring portion 37 is placed with the loose screw 39 at one end of the slot 38. The rare gas reservoir 23 has its top 24 still sealed off and the space above has a connection through the tube 22, valve 21, tube 30 and tubes 20 and 14, tube 16, open valve 17 to the vacuum pump. The pump acts to remove the atmosphere of these connections to the desired vacuum.

After the pump has created the necessary vacuum in these connections, the handle 36 is moved to the dotted position illustrated in Fig. 3. This position brings the passageway 35 to the inlet 27 and the passageway 34 of the revolvable body 32 is closed off by the wall of the housing 26. The screw 39 is now at the opposite end of the slot 38. This screw is then locked in this position so that the handle 39 cannot revolve counter-clockwise because blocked by the end 37' of the part ring, but only clock-wise to approximately 90°.

A magnet means 40 is then placed around the tube 22 to lift the iron piece 25 which is then suddenly dropped on the reservoir top 24, breaking the thin glass therein. The rare gas from the reservoir 23 fills the tube 22 and the passageway in the valve body comprising the passageways 34 and 35, as shown in Fig. 4.

Up to this point the apparatus has been handled by a skilled worker familiar with tube manufacture. From this point on, because of the advantages of my invention, the further filling of the tubes with gas can be turned over to the usual factory worker. The factory worker is now limited to revolving the handle 36 from the position in Fig. 4 to the position disclosed in Fig. 5 between the ends 37' and 37" of the part ring. As the handle 36 starts to turn to the right or clockwise, the passageway 35 is closed off from the inlet 27 and the volume of gas occupied by the combined passageways 34 and 35 is imprisoned in the revolving body portion 32 of the valve. Valve 17 is now closed and the tubes may be filled with rare gas as explained in the following description.

When the lever 36 of the valve reaches the position disclosed in Fig. 5, this volume of gas expands through the opening 29 to the tube 20 connected to the exhaust manifold, and thus into the tubes sealed on said manifold. The size of the passageways 34 and 35 in the revolving body 32 of the valve 21 is preferably so designed with the size of the passageways to the exhaust manifold and tubes 12 that the tubes are filled with the desired pressure therein. If this design becomes impractical, a definite number of turns from position 37' to 37" may be used. The tubes can then be sealed off from the manifold and other tubes inserted thereon. The factory worker will then repeat the operations of Figs. 4 and 5 until the gas reservoir 23 is exhausted.

It will be noted that during the handling of the apparatus by the factory worker, the only portion of the gas that may be wasted by inadvertent opening of the valve 17 to the vacuum pump or by an improperly sealed exhaust manifold or accident thereto would be the tiny volume defined by the volume of the passageways 34 and 35 in the valve 21. The apparatus prevents the direct connection of the gas reservoir 23 to the vacuum pump by inadvertence while in the hands of a factory worker, because of the locking means provided by the part ring 37 and screw 39, restricting the operation of the valve 21 to the limit of travel between the ends 37' and 37" illustrated in Figs. 4 and 5.

Instead of filling the tube with a so-called "one-shot" filling, it may be desirable to fill the tubes with approximately half of the filling and then perform some process of treatment and then fill up the tubes with an additional filling of gas by additional turns of the stop cock after this treatment. For this operation the dimensions of the passageways 34 and 35 can be adapted. By means of my invention several hundred tubes, such as 600 tubes, may be filled with gas by a factory worker from one reservoir of 50 cubic centimeters of a rare gas such as xenon.

The locking means of the part ring and screw may be changed to other forms. It is apparent that many other modifications may be made in the preferred embodiment disclosed without departing from the spirit of the invention and accordingly I do not desire any limitations thereon except as is necessitated by the spirit of the following claims.

I claim:

1. Apparatus for filling devices with gas which comprises a gas reservoir, a manifold, a vacuum pump and a valve, said valve comprising a housing having an inlet and outlets and a revolvable passageway therein, said inlet connected to said gas reservoir, two of said outlets connected to each other and to the manifold and vacuum pump, said valve passageway revolvable to a position connecting said inlet and a first outlet and to a second position connecting said inlet only and to a third position in sequence from said second position connecting said second outlet only.

2. Apparatus for filling devices with gas which comprises a gas reservoir, a manifold, a vacuum pump and a valve, said valve comprising a housing having an inlet and outlets and a revolvable passageway therein, said inlet connected to said gas reservoir, two of said outlets connected to each other and to the manifold and vacuum pump, said valve passageway revolvable to a position connecting said inlet and a first outlet and to a second position connecting said inlet only and to a third position in sequence from said second position connecting said second outlet only, and means operable to prevent said passageway movable to said first mentioned position.

WARD W. WATROUS, Jr.